Aug. 21, 1956 S. R. PARKER ET AL 2,760,075
AMPLITUDE STABILIZED TRANSITRON OSCILLATOR
Filed Jan. 7, 1954
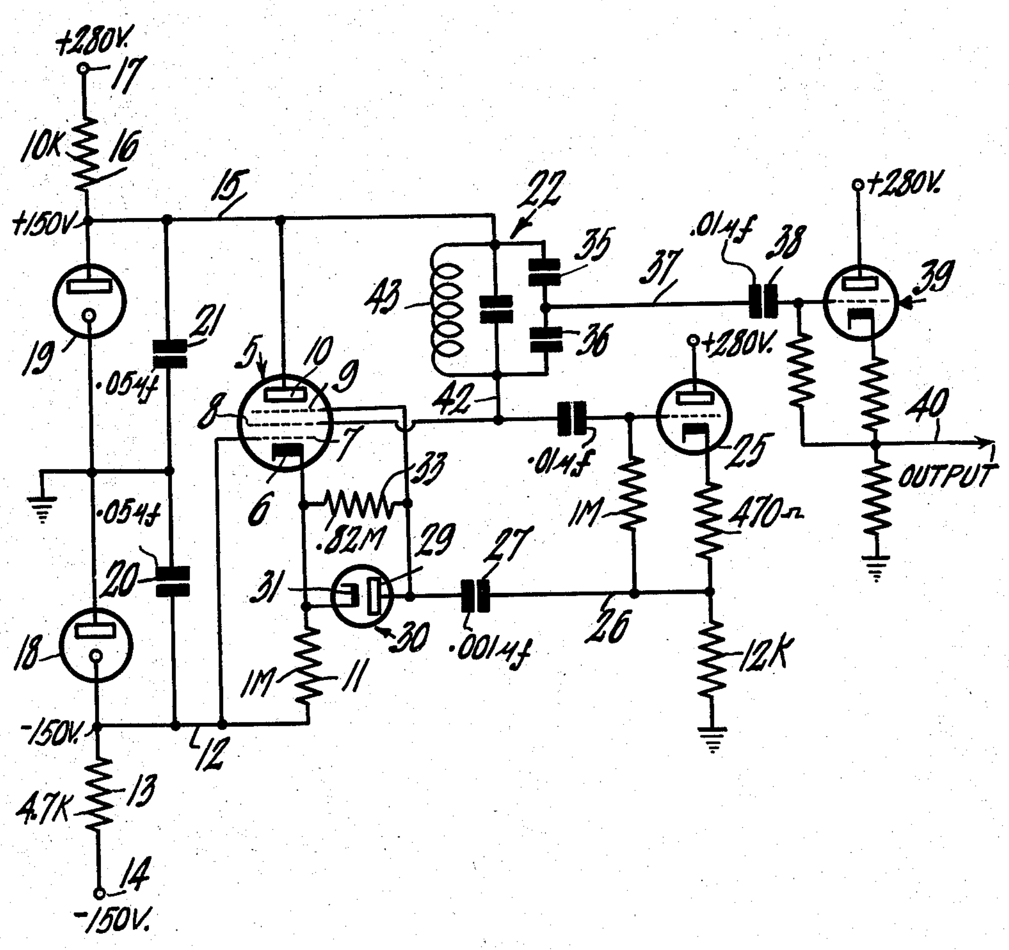
INVENTORS
SYDNEY R. PARKER
& HERMAN JACOBOWITZ
BY Charles H. Brown
ATTORNEY United States Patent Office 2,760,075

Patented Aug. 21, 1956

2,760,075

AMPLITUDE STABILIZED TRANSITRON OSCILLATOR

Sydney R. Parker, Pitman, N. J., and Herman Jacobowitz, Philadelphia, Pa., assignors, by mesne assignments, to the United States of America as represented by the Secretary of the Navy Application January 7, 1954, Serial No. 402,686

11 Claims. (Cl. 250—36)

This invention relates to a transitron oscillator, and more particularly, to a transitron oscillator having a substantially constant output amplitude varying in a substantially pure sine wave manner.

It is known to stabilize the frequency of oscillators. It is also known to provide oscillators arranged to produce an output wave of generally sine waveform and having a generally constant amplitude despite changes which may occur in the vacuum tubes, the power supply voltages and as the result of other disturbing factors.

The known methods by which amplitude stability may be obtained include amplitude limiting schemes which cause the output wave to depart in shape from a pure sine wave. This results in the generation of undesired harmonic frequencies. It is, therefore, a general object of this invention to provide an improved oscillator which is stabilized against amplitude variations while faithfully providing a sine wave output.

Transitron oscillators are known which provide an output with a fair degree of amplitude stability. The degree of such amplitude stability, however, is not as high as is often desired. It is, therefore, another object of this invention to provide an improved transitron oscillator having a greater degree of amplitude stability than can be had with prior art oscillators.

A transitron oscillator may be defined as one including a multi-grid vacuum tube wherein the suppressor grid potential is used to control the screen grid current. The characteristics of the tube are such that a positive increment of suppressor grid voltage (a decrease of negative voltage) allows more electrons to go to the plate electrode, thus decreasing the screen grid current. This characteristic is used to produce sustained oscillations by placing a tuned circuit between the screen grid and plate (or cathode), and providing means coupling the screen potential to the suppressor grid. According to one feature of the present invention, a cathode follower is included in the circuit coupling the screen grid and the tank circuit to the suppressor grid so as not to disturb the high Q of the tank circuit. Another feature is the use of a resistance-shunted diode connected between the suppressor grid and the cathode of the oscillator tube to generate an amplitude stabilizing bias potential. Additional features of the invention include the use of a degenerative cathode resistor in the oscillator circuit to provide stability against variations in vacuum tubes, a power supply voltage stabilizing arrangement, and a cathode follower output circuit.

These and other objects and features of the invention will be apparent to those skilled in the art from the following more detailed description taken in conjunction with the appended drawing showing a circuit diagram of one embodiment of the invention.

The drawing shows an amplitude stabilized transitron oscillator including an oscillator tube 5 having a cathode 6, a control grid 7, a screen grid 8, a suppressor grid 9 and a plate electrode 10. The cathode 6 is connected thru a degenerative cathode resistor 11, thru a lead 12 and a stabilizing resistor 13 to the negative terminal 14 of a source of uni-directional potential referenced to ground. The plate electrode 10 is connected thru a lead 15 and a stabilizing resistor 16 to the positive terminal 17 of a source of uni-directional potential referenced to ground. The lead 12 is connected thru a voltage regulator tube 18 to ground, and the lead 15 is connected thru a voltage regulator tube 19 to ground. Voltage regulator tubes 18 and 19 are shunted by by-pass capacitors 20 and 21, respectively.

A tank circuit generally designated 22 is connected on one side to the plate electrode 10, and on the other side to the screen grid 8. The screen grid 8 is coupled to the input of a cathode follower tube 25. An output from the cathode follower tube 25 is taken over lead 26 and coupling capacitor 27 to the suppressor grid 9 of the oscillator tube 5. The suppressor grid 9 is connected to the anode 29 of a diode 30 having a cathode 31 connected to the cathode 6 of oscillator tube 5. A resistor 33 is connected across the diode 30.

Voltage divider capacitors 35 and 36, forming a part of the tank circuit 22, provide a point at which an output lead 37 is connected. The output over lead 37 is coupled thru a coupling capacitor 38 to the grid of an output cathode follower tube 39. Output is taken over lead 40 from the cathode circuit of the output cathode follower tube 39.

In the operation of the stabilized transitron oscillator of the invention, the voltage regulator tubes 18 and 19, in cooperation with resistors 13 and 16, serve to maintain the potential on lead 12 at a predetermined negative value, and the potential on the lead 15 at a predetermined positive value. These predetermined values are maintained despite considerable variations which may occur in the power supply potentials at terminals 14 and 17. So far as alternating currents are concerned, the leads 12 and 15 are at ground potential due to the action of by-pass capacitors 20 and 21, respectively.

The end 42 of tank 22 is the "hot" end of the tank so far as alternating currents are concerned. Part of the electrons flowing from the cathode 6 of oscillator tube 9 go to the screen grid 8 which is connected to the end 42 of tank coil 22, and part of the electrons pass on to the plate electrode 10 which is connected to the other or grounded end of tank 22. The instantaneous potential on the suppressor grid 9 determines the division of electrons from the cathode 6 to the screen grid 8 and the plate 10. If, at any instant of time, the potential on the suppressor grid 9 rises (becomes less negative) for any reason, a larger proportion of the electrons from cathode 6 go on to plate 10 and a smaller proportion flow in the circuit of screen grid 8. When less current flows from screen grid 8 thru inductor 43 of tank 22, the potential at 42 rises. This increase in potential is coupled thru cathode follower tube 25, lead 26 and coupling capacitor 27 to the suppressor grid 9 of oscillator tube 5. (By use of the cathode follower tube 25, the coupling to the suppressor grid is accomplished without decreasing the Q of the tank circuit.) This further increases the proportion of electron current which reaches the plate electrode 10 and further decreases the proportion flowing in the screen grid circuit. When a point is reached at which the rate of change in the current division decreases, the potential at the end 42 of tank 22 starts to fall and this decrease in potential is coupled thru the cathode follower tube 25 back to the suppressor grid 9 of oscillator tube 5. When the potential on the suppressor grid 9 falls, an increasing proportion of the electrons from cathode 6 go to screen grid 8 and fail to reach the plate electrode 10. A sustained oscillation is thus established in the tank 22 at the frequency to which the tank circuit is tuned.

The amplitude of oscillation is determined by the limits of variation of screen grid current during a cycle of oscillator operation, which in turn is determined by the variation in the suppressor-to-cathode voltage. At one extreme, the maximum screen current flows when the suppressor is sufficiently negative so that all the possible current goes to the screen, and therefore, making the suppressor more negative can not change the screen voltage. At the other extreme, the screen current is limited by means of diode 30 which does not permit the suppressor voltage to go more positive than the cathode. Thus, the limits of oscillator amplitude are determined by the tube saturation on the one hand and the clamping action of the diode on the other hand. Since both of these limits are fixed, the amplitude of oscillation is fixed. It should be noted that this is accomplished without affecting the tank circuit, and therefore, without distorting the pure sine wave oscillations.

Resistor 33 is used to fix the effective back resistance of diode 30 and so provide a discharge path for capacitor 27. This is necessary so that diode 30 can conduct during every positive peak and thereby give positive clamping action.

Output energy is taken from the tank 22 over lead 37 and thru a coupling capacitor 38 to the grid of a cathode follower output tube 39. An output is obtained at 40 from the output cathode follower tube. By the use of the cathode follower output tube 39, the utilization circuit (not shown) does not load the tank 22 sufficiently to disturb the Q thereof.

By way of example, an oscillator was constructed with the values of circuit components shown in the drawing and with a tank circuit 22 tuned to provide oscillations at 1200 cycles per second. The output sine wave had an overall measured distortion of less than 0.2%, and the amplitude of the output was stable within 0.1%. The degenerative cathode resistor 11 stabilized the circuit against changes in the tube so that various tubes could be substituted for the oscillator tube 5 without any discernible change in the output amplitude of the oscillator.

It is apparent that according to the teachings of this invention there is provided a transitron oscillator having an output which is stabilized in amplitude against the effects of power supply variation, variations within the oscillator tube, and variations in the loading produced by a utilization circuit connected to the output of the oscillator.

What is claimed is:

1. A stabilized transitron oscillator comprising, an oscillator tube including cathode, screen grid, suppressor grid and plate electrodes, a tank circuit having one end coupled to said screen grid and the other end coupled to said plate and to a point of reference potential, a circuit including a cathode follower coupling said screen grid to said suppressor grid, and a resistance-shunted diode connected between said suppressor grid and said cathode.

2. A stabilized transitron oscillator comprising, an oscillator tube including cathode, first grid, second grid and plate electrodes, a tank circuit having one end connected to said first grid and the other end connected to said plate, coupling means including a cathode follower connected from said first grid to said second grid, a diode connected from said cathode to said second grid to limit the positive voltage excursion thereon to a predetermined value, and a resistor connected from said cathode to a point of reference potential.

3. A stabilized transitron oscillator comprising, an oscillator tube including cathode, screen grid, suppressor grid and plate electrodes, a tank circuit having one end connected to said screen grid and the other end connected to said plate, coupling means including a cathode follower connected from said screen grid to said suppressor grid, a cathode circuit connected to said cathode, and a diode connected from said cathode circuit to said suppressor grid to limit the positive voltage excursion on said suppressor grid.

4. A transitron oscillator as defined in claim 3 wherein said diode includes an anode connected to said suppressor grid, and includes a cathode connected to the cathode of said oscillator tube.

5. A stabilized transitron oscillator comprising, an oscillator tube including cathode, screen grid, suppressor grid and plate electrodes, a tank circuit having one end coupled to said screen grid and the other end coupled to said plate, coupling means including a cathode follower connected from said screen grid to said suppressor grid, a cathode circuit connected to said cathode, and a diode having an anode connected to said suppressor grid and having a cathode connected to said cathode circuit.

6. A stabilized transitron oscillator as defined in claim 5, and in addition, a cathode follower output stage coupled to said tank circuit.

7. A stabilized oscillator comprising, an oscillator tube including cathode, screen grid, suppressor grid and plate electrodes, a tank circuit having one end coupled to said screen grid and the other end coupled to said plate, a cathode follower having an input coupled to said screen grid and an output coupled to said suppressor grid, and a diode having an anode connected to said suppressor grid and having a cathode connected to the cathode of said oscillator tube.

8. A stabilized transitron oscillator comprising an oscillator tube including cathode, screen grid, suppressor grid and plate electrodes, a source of uni-directional potential having positive and negative terminals, a tank circuit having one end connected to said screen grid and the other end connected to said plate and to said positive terminal, a cathode resistor connected from said cathode to said negative terminal, a cathode follower circuit including an input coupled to said screen grid and an output coupled to said suppressor grid, and a diode having an anode connected to said suppressor grid and having a cathode connected to the cathode of said oscillator tube.

9. A stabilized transitron oscillator as defined in claim 8, and in addition, a control grid in said oscillator tube connected to said negative terminal.

10. A stabilized transitron oscillator as defined in claim 9, and in addition, a resistor connected in shunt with said diode.

11. A stabilized transitron oscillator comprising, an oscillator tube including cathode, screen grid, suppressor grid, and plate electrodes, a tank circuit having one end coupled to said screen grid and the other end coupled to said plate, coupling means connected from said screen grid to said suppressor grid, a cathode circuit connected to said cathode, a diode having an anode connected to said suppressor grid and having a cathode connected to said cathode circuit, a source of unidirectional potential having positive and negative terminals, a resistor connected from said positive terminal to the plate of said oscillator tube, at least one voltage regulator tube connected from said plate to the cathode circuit of said oscillator tube, a resistor connected from said cathode circuit to said negative terminal, and at least one by-pass capacitor connected from the plate of said oscillator tube to the cathode circuit of said oscillator tube.

References Cited in the file of this patent

UNITED STATES PATENTS

| | | |
|---|---|---|
| 2,552,949 | Flemming-Williams | May 15, 1951 |
| 2,676,263 | Hugenholtz et al. | Apr. 20, 1954 |

OTHER REFERENCES

"Electrical Communications," March 1952, pages 52–53.